US011086921B2

(12) United States Patent
Pigulea et al.

(10) Patent No.: US 11,086,921 B2
(45) Date of Patent: Aug. 10, 2021

(54) SYSTEMS AND METHODS TO ENABLE DIGITAL CONTENT AGGREGATION AND DISTRIBUTION (71) Applicants: Sorin Mihail Pigulea, Bucharest (RO); Orlando Razvan Matei, Bucharest (RO)

(72) Inventors: Sorin Mihail Pigulea, Bucharest (RO); Orlando Razvan Matei, Bucharest (RO)

(*) Notice: Subject to any disclaimer, the term of this patent is extended or adjusted under 35 U.S.C. 154(b) by 0 days.

(21) Appl. No.: 16/565,014

(22) Filed: Sep. 9, 2019

(65) Prior Publication Data
US 2020/0110772 A1 Apr. 9, 2020

Related U.S. Application Data (60) Provisional application No. 62/743,310, filed on Oct. 9, 2018.

(51) Int. Cl.
G06F 16/435 (2019.01)
G06F 16/438 (2019.01)
G06F 21/62 (2013.01)
G06F 9/451 (2018.01)
H04L 29/06 (2006.01)

(52) U.S. Cl.
CPC ............ *G06F 16/438* (2019.01); *G06F 9/451* (2018.02); *G06F 16/435* (2019.01); *G06F 21/6218* (2013.01); *H04L 65/4069* (2013.01)

(58) Field of Classification Search
CPC ...... G06F 16/438; G06F 9/451; G06F 16/435; G06F 21/6218; H04L 65/4069; H04L 65/4084; H04L 65/605
See application file for complete search history.

(56) References Cited

U.S. PATENT DOCUMENTS

2011/0289317 A1* 11/2011 Darapu ............ H04N 21/25816 713/168
2017/0147576 A1* 5/2017 Des Jardins ............ G06F 16/48

FOREIGN PATENT DOCUMENTS

JP 4844220 B2 * 12/2011

* cited by examiner

Primary Examiner — Justin R. Blaufeld (57) ABSTRACT

Systems and methods for enabling digital content aggregation and distribution are disclosed. In some aspects, the system comprises a user computing device and digital content information stores each communicatively coupled to a control circuit. The computing device comprising a display configured to render a digital content UI. The digital content information stores each comprising digital content items and associated with a unique content platform. The control circuit configured to: receive authentication data; receive a query for a digital content item of interest; access the digital content information stores; determine the presence of digital content item of interest in at least one of the digital content information stores; and transmit the digital content item of interest to the digital content UI for rendering via the display when the digital content item of interest is determined to be present in one of the digital content information stores.

12 Claims, 7 Drawing Sheets

SYSTEMS AND METHODS TO ENABLE DIGITAL CONTENT AGGREGATION AND DISTRIBUTION

CROSS-REFERENCE TO RELATED APPLICATIONS

This application claims priority to U.S. Provisional Application No. 62/743,310 filed Oct. 9, 2018, which is hereby incorporated herein by reference

FIELD OF THE INVENTION

The present invention relates generally to digital distribution and specifically to systems and methods to enable digital content aggregation and distribution.

BACKGROUND OF THE INVENTION

Digital distribution refers to the delivery or distribution of digital media content such as audio, video, software and video games. Content distributed online may be streamed or downloaded, and often consists of books, films, and television programs, music, software, and video games. Streaming typically involves downloading and using content at a user's request, or "on-demand," rather than allowing a user to store it permanently. Streaming media typically refers to multimedia that can be constantly received by and presented to end-users while being delivered by content providers. Client end-users can use their media player to start playing digital video or digital audio content before the entire file has been transmitted.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Modifications, additions, or omissions may be made to the systems and methods described herein without departing from the scope of the disclosure. For example, the components of the systems may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Digital distribution refers to the delivery or distribution of digital media content such as audio, video, software and video games. Content distributed online may be streamed or downloaded, and often consists of books, films, and television programs, music, software, and video games. Streaming typically involves downloading and using content at a user's request, or "on-demand," rather than allowing a user to store it permanently. Streaming media typically refers to multimedia that can be constantly received by and presented to end-users while being delivered by content providers. Client end-users can use their media player to start playing digital video or digital audio content before the entire file has been transmitted.

Embodiments of the instant application seek to provide a system and computer-implemented method for enabling digital content aggregation and distribution. The system can comprise a user computing device(s) each comprising at least one display configured to render a digital content user interface(s). Digital content user interfaces are configured to convey digital content items from unique digital content platforms. The system can further comprise a plurality of digital content information stores, each associated with one of the unique content platforms and comprising a plurality of unique digital content items. A control circuit(s) may be communicatively coupled to the user computing device and the plurality of digital content information stores.

The control circuit(s) may be configured to, amongst other things, receive, via the user computing device, authentication data. A query for at least one digital content item of interest can be received via the user computing device. Using the authentication data, the plurality of digital content information stores can be accessed. The presence of the digital content item of interest(s) in at least one of the plurality of unique digital content information stores can be determined. The digital content item(s) of interest can be transmitted to the digital content user interface for rendering via the display when the digital content item of interest is determined to be present in at least one of the plurality of unique digital content information stores.

The method can comprise receiving authentication data from at least one user computing device comprising at least one display that may be configured to render a digital content user interface, the digital content user interface may be configured to convey digital content items from unique digital content platforms; accessing a plurality of digital content information stores using the authentication data, each digital content information store may be associated with a unique digital content platform and comprising a plurality of unique digital content items; determining the presence of the digital content item of interest in at least one of the plurality of unique digital content information stores; and transmitting the digital content item(s) of interest to the digital content user interface for rendering via the display when the digital content item of interest is determined to be present in at least one of the plurality of unique digital content information stores, the rendering can utilize at least one predetermined visualization schemes.

Embodiments disclosed herein include many aspects and features that relate to as well as are described in the context of accessing a universal user interface that conveys digital content derived from one or more service platforms.

Aspects of a universal user interface may seek to aggregate digital content derived from a plurality of digital content platforms and make such content available to users in a centralized digital content user interface ("UI"). In certain aspects, the UI can allow users to access digital content derived from a multitude of digital content platforms (e.g., over-the-top digital platforms, video on demand digital platforms, subscription-based video on demand digital platforms, transactional-based video on demand, advertisement-based video on demand, or a combination of two or more thereof). In other aspects, the UI can allow users to obtain access to the plurality of digital content platforms using a single authentication step. For example, the UI can be downloaded on to user computing devices or accessed via web browsers.

The UI can provide users with a uniform experience as well as reduce the need for users to get accustomed with several platforms. The UI can facilitate navigation between digital content platforms, which typically function independently of each other. The UI can reduce the need to download separate digital content platforms. Even more, the UI can generate inclusive login information that is valid for each digital content platform, which reduces/eliminates the need for separate login information. Content delivery networks ("CDN") are typically geographically distribute networks of proxy servers and associated data center. CDN can increase availability and performance by distributing the service spatially relative to end-users.

Some aspects of the UI can be utilized in the context of a CDN, which can enable optimization of the updating process as well as reduction of the required bandwidth for such processes. Here, updates to digital content may be accomplished at the framework level, thereby simultaneously affecting all the subordinated platforms. Further, the UI may optimize marketing budgets by facilitating the promotion of niche products and limiting untargeted campaigns/misfires.

Figure 1:
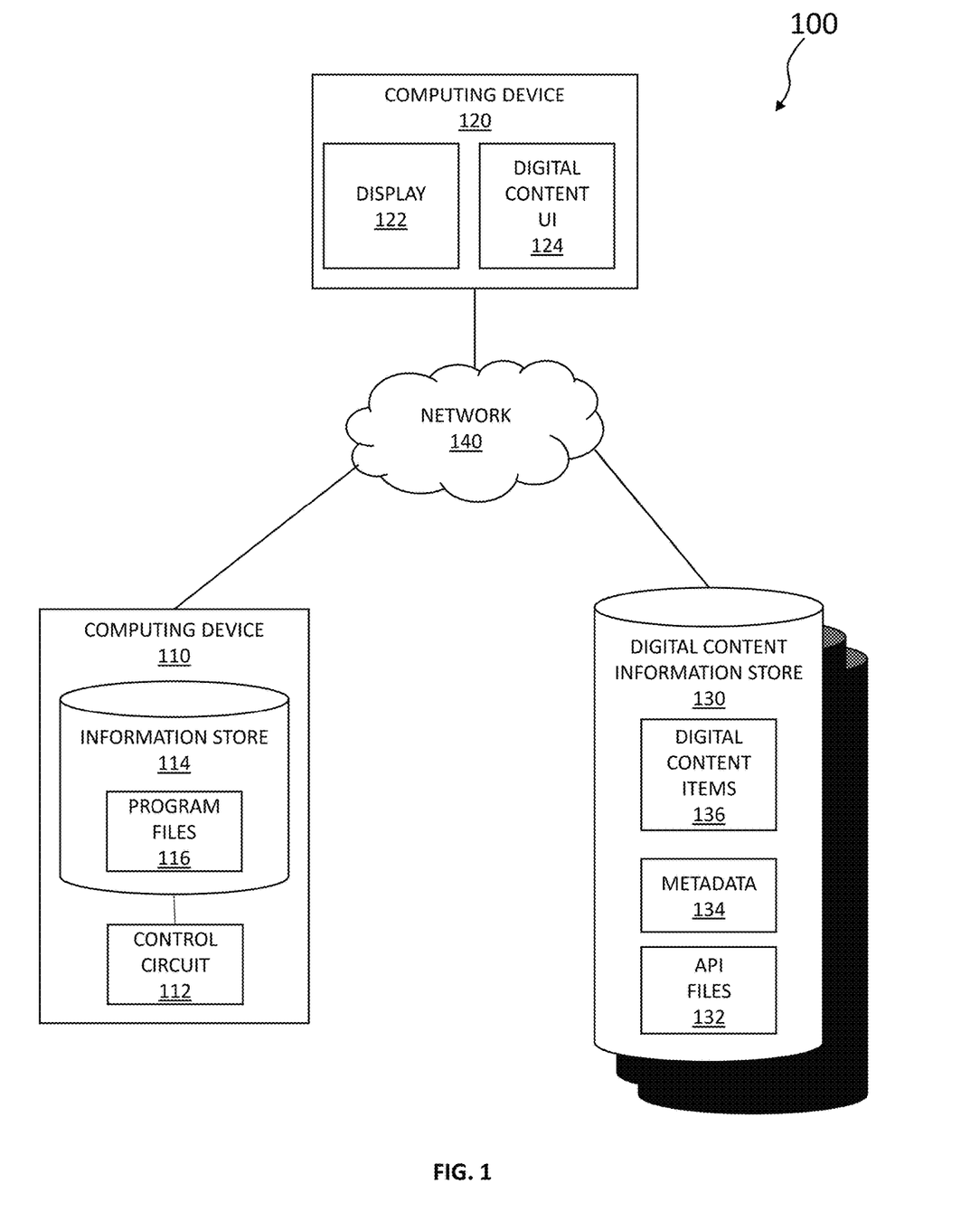
FIG. 1 is a block diagram illustrating an environment for enabling digital content aggregation and distribution according to some embodiments.

Referring to the drawings, FIG. 1 is a block diagram illustrating an environment, generally 100, for enabling digital content aggregation and distribution according to some embodiments. Environment 100 comprises computing devices 110 and 120 as well as digital content information store 130, all in communication via network 140. Network 140 can be, for example, a local area network (LAN), a wide area network (WAN), such as the Internet, a distributed computing environment, or a combination of the two, and can include wired, wireless, or fiber optic connections. Network 140 can be compatible with a variety of frequencies, such as those associated with Bluetooth®, Wi-Fi, LTE, cellular, radio, microwave, as well as other wireless communication protocols known in the art. In general, network 140 can be any combination of connections and protocols that will support communications between computing devices 110 and 120 as well as digital content information store 130.

In some embodiments, computing devices 110 and/or 120 can be computing devices, personal computers, wearable computing devices, distributed computing systems, tablet computers, smartphones, smart home devices, internet-of-things ("IOT") computing devices, or any electronic devices that can communicate with network 140 to enable digital content aggregation and distribution as disclosed in one or more embodiments herein. In other embodiments, digital content information store 130 can be one or more storage devices that may be used for storing, porting and/or extracting data files and objects. For example, digital content information store 130 may contain and store information both temporarily and permanently, and can be internal or external to a computer, server or any similar computing devices.

Embodiments of computing device 110 may comprise at least one control circuit 112 communicatively coupled to information store 114. For example, control circuit 112 can perform one or more of processes, methods, and/or steps disclosed herein (e.g., the processes, methods, and/or steps conveyed in program files 116). Aspects of information store 114 can refer to at least one storage device that may be used for storing, porting and/or extracting data files and objects. In other aspects, information store 114 can be an external storage device communicatively coupled to network 140. For example, program files 116 can comprise one or more of the processes, methods, and/or steps disclosed herein. Certain aspects of program files 116 can include downloadable versions of digital content UI 124, predetermined visualization schemes, formatting schemes, language protocols, graphical user interface items, or a combination of two or more thereof.

Computing device 120 can represent an end-user device utilized to access digital content UI 124. Aspects of computing device 120 can comprise one or more display 122 and digital content UI 124. For example, display 122 can be an output device configured to render information (e.g., digital content items 136) in visual form. Display 122 can be a liquid crystal display, light-emitting diode display, a plasma display, a quantum dot display, a 2-dimensional display, a three-dimensional display, as well as other types of displays. In certain embodiments, display 122 can render digital content UI 124. Aspects of UI 124 can convey digital content (e.g., digital content items 136) to users of computing device 120.

In other embodiments, digital content information store 130 can be one or more information storage devices that can each comprise digital content items 136, metadata 134, and API files 132. For example, each digital content information store 130 can be associated with a particular digital content platform/provider (e.g., Company X, Company Y, and Company Z). Digital content items 136 can include video content, audio content, images, video games, software, or a combination of two or more thereof. Digital content items 136 can be streamable (e.g., able to be transmitted or received over the Internet in a steady, continuous flow) or downloadable (e.g., able to be copied from one computer to another or to a disk).

Aspects of metadata 134 can comprise information that provides information about other data (e.g., digital content items 136). For example, metadata 134 can include descriptive metadata (e.g., information that describes a resource for purposes such as discovery and identification; may include elements such as title, abstract, author, keywords, and other descriptive information), structural metadata (e.g., information about containers of data and can indicates how compound objects are put together, such as, how television episodes are ordered to form television series; can describe types, versions, relationships and other characteristics of digital materials), administrative metadata (e.g., information that may help manage a resource, such as when and how it was created, file type and other technical information, and who can access it), reference metadata (e.g., information that can describes the contents and quality of statistical data), statistical metadata (e.g., information that can describe processes that collect, process, or produce statistical data; such metadata are also called process data), or a combination of two or more thereof.

Application program interfaces (hereinafter "API") are typically software intermediaries that allow two applications to communication with each other. For example, APIs are typically utilized when users access applications on their mobile devices and, in response, the applications connect to the Internet and send data to a server. Here, the server typically retrieves the data, interprets it, performs the necessary actions and transmits the data back to the user. The application then interprets the data and presents the user with the desired information in a readable manner. This particular process typically requires the use of one or more APIs.

Figure 2:
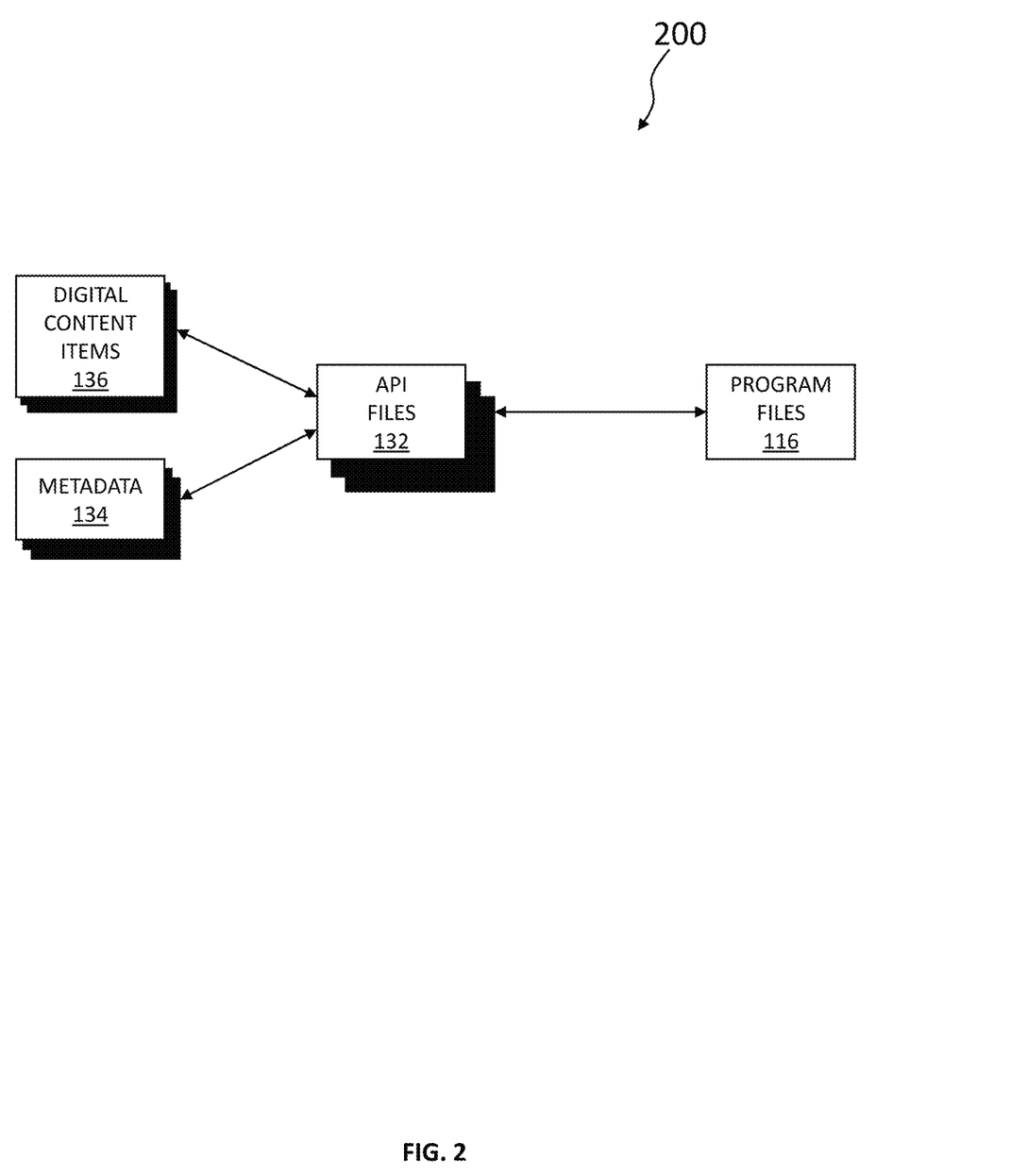
FIG. 2 is a block diagram illustrating information access via application programming interfaces according to some embodiments.

FIG. 2 is a block diagram illustrating information access via APIs according to some embodiments. In some aspects, API files 132 can be utilized to access metadata 134 and/or digital content items 136. For example, accessing metadata 134 can provide information describing the contents and/or context of digital content items 136.

Figure 3:
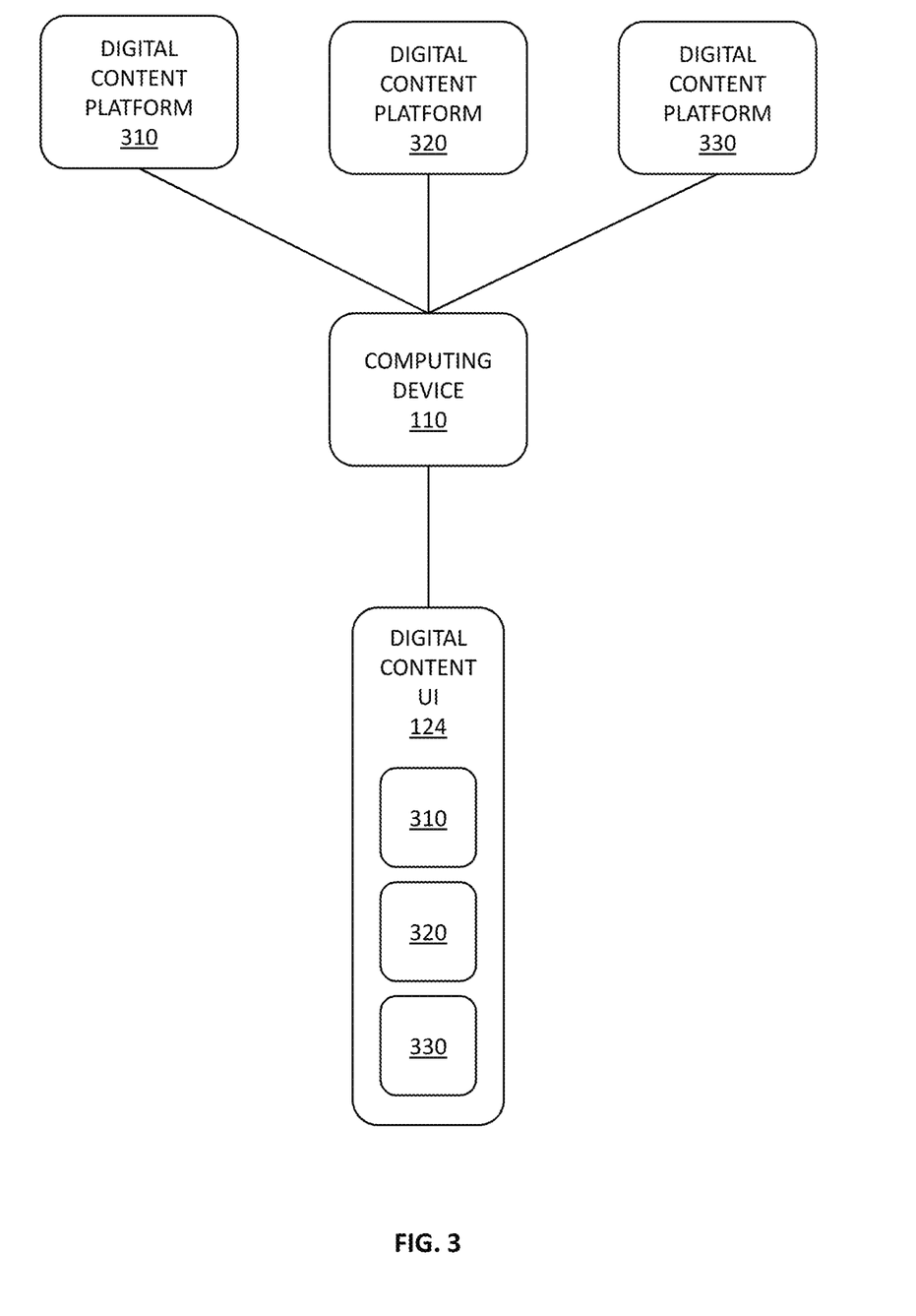
FIG. 3 is a block diagram illustrating and exemplary digital content aggregation and distribution according to other embodiments.

FIG. 3 is a block diagram illustrating an exemplary digital content aggregation and distribution scheme according to other embodiments. Not to be limited by theory. Digital content platforms are typically online spaces that allow users to engage (e.g., purchase, share, and/or communicate) with digital content. Digital content platforms typically engage in digital distribution. Digital content platforms may be accessed via, for example, the Internet using computing devices as well as mobile computing devices (e.g., computing tablets, smart phones, wearable computing devices, and similar mobile devices). Examples of digital content platforms include, but are not limited to, YouTube®, Facebook®, Amazon Video®, Hulu®, Netflix®, iTunes®, etc.

Digital content platforms 310, 320, and 330 can each be associated with a unique digital content platform and may or may not provide unique digital content (e.g., may or may not include unique digital contact items 136). In some embodiments, digital content platforms 310, 320, and 330, or a combination of two or more thereof may be owned by a single entity (e.g., iTunes® and Apple Music® are both owned by Apple Inc.). Here, digital content UI 124 can allow users to access digital content provided by digital content platforms 310, 320, and 330 as well as view digital content within a centralized framework.

Figure 4:
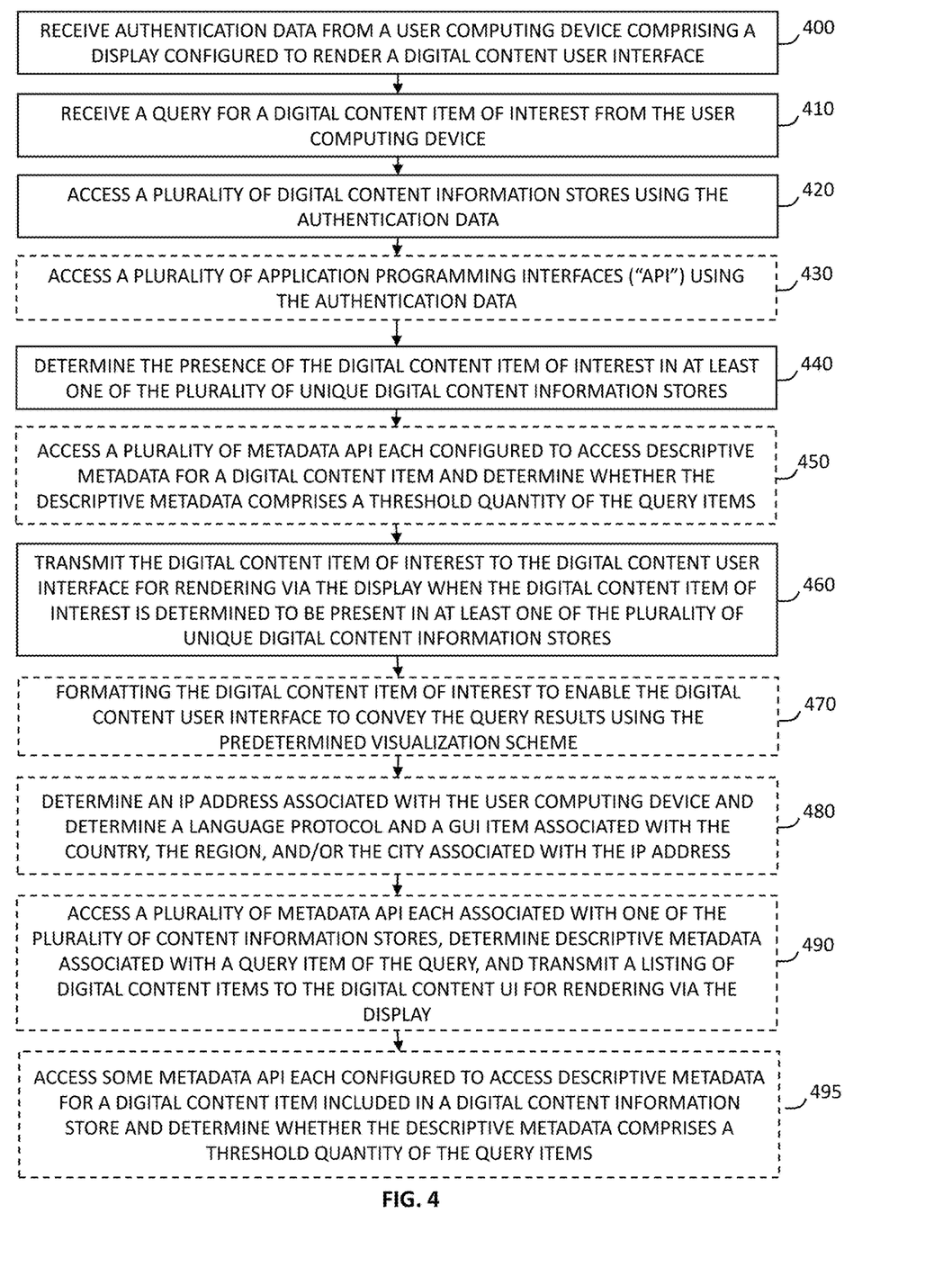
FIG. 4 depicts a method for enabling digital content aggregation and distribution according to yet still other embodiments.

FIG. 4 depicts a method for enabling digital content aggregation and distribution according to yet still other embodiments. At step 400, authentication data is received from user computing device 120 comprising display 122 that is configured to render digital content user interface 124, digital content user interface 124 is configured to convey digital content items 136 from unique digital content platforms. For example, computing device 120 can transmit authentication data to computing device 110. At step 410, a query for a digital content item of interest can be received from user computing device 120. For example, computing device 120 can transmit a query for particular digital content (e.g., Movie X) included in digital content items 136 to computing device 110. At step 420, digital content information stores 130 can be accessed using the authentication data. For example, one or more authentication protocols (e.g., a computer communications protocol and/or cryptographic protocol known in the art) can be utilized to access digital content information store 130 using the authentication data.

At step 430, API files 132 can be accessed using the authentication data. In certain embodiments, each of the API files 132 can be associated with one of the plurality of digital content information stores 130. For example, the authentication data can be used to access API files 132 (e.g., access an authentication API included in API filed 132 that can facilitate access to digital content items 136). At step 440, the presence of the digital content item of interest in at least one of the unique digital content information stores 130 is determined. At step 450, the step of accessing the plurality of digital content information stores 130 comprises accessing a plurality of APIs (e.g., included in API files 132) using the authentication data, where each API is associated with one of the digital content information stores 130.

At step 460, the digital content item of interest (e.g., included in digital content items 136) can be transmitted to digital content user interface 124 for rendering via display 122 when the digital content item of interest is determined to be present in at least one of the digital content information stores 130. At step 470, the step of transmitting the digital content item of interest to the digital content user interface 124 can include formatting the digital content item of interest to enable the digital content user interface 124 to convey the query results using the predetermined visualization scheme. For example, formatting the digital content item of interest can include the use of such formatting as pixel interpolation, image sharpening, warp stabilization, exposure adjustment, frame averaging, speed reduction, demonstrative highlighting, or a combination of two or more thereof.

At step 480, an IP address associated with user computing device 120 can be determined as well as a language protocol and/or a graphical user interface ("GUI") item associated with the country, the region, and the city. For example, "IP geolocation" is a geolocation technique that typically refers to determining an Internet's users location via their IP address (e.g., "IP address" can refer to a unique string of numbers separated by periods that identifies a computing device using the Internet Protocol to communicate over a network), which are typically associated with a country, a region, a city, zip code, longitude and latitude, post/ZIP code, or a combination of two or more thereof.

In other embodiments, Internet user's location may be determined using the media access control addresses ("MAC address") of their associated devices. For example, MAC addresses are unique identifiers that can be assigned to a network interface controller. MAC addresses are typically assigned by the manufacturer of the network interface cards. A MAC address may be referred to as the "burned-in address," and is also known as an "Ethernet hardware address," "hardware address," and "physical address" (not to be confused with a memory physical address).

At step 490, metadata APIs (e.g., included in API files 132) each associated with one of the content information stores are accessed in addition to descriptive metadata for a digital content item 136 included in one of the digital content information stores 130, where each API is configured to provide access to descriptive metadata (e.g., included in metadata 134) for digital content items 136 included in one of the digital content information stores 130; descriptive metadata associated with query items can be determined; and a listing of digital content items can be transmitted to digital content user interface 124 for rendering via display 122. For example, the listing of digital content items can include the determined descriptive metadata.

At Step 495, to determine the presence of the digital content item of interest, metadata APIs can be accessed, where each API is configured to access descriptive metadata for a particular digital content item 136 included in one of the digital content information stores 130 and whether the descriptive metadata comprises a threshold quantity of the query items can be determined.

Figure 5:
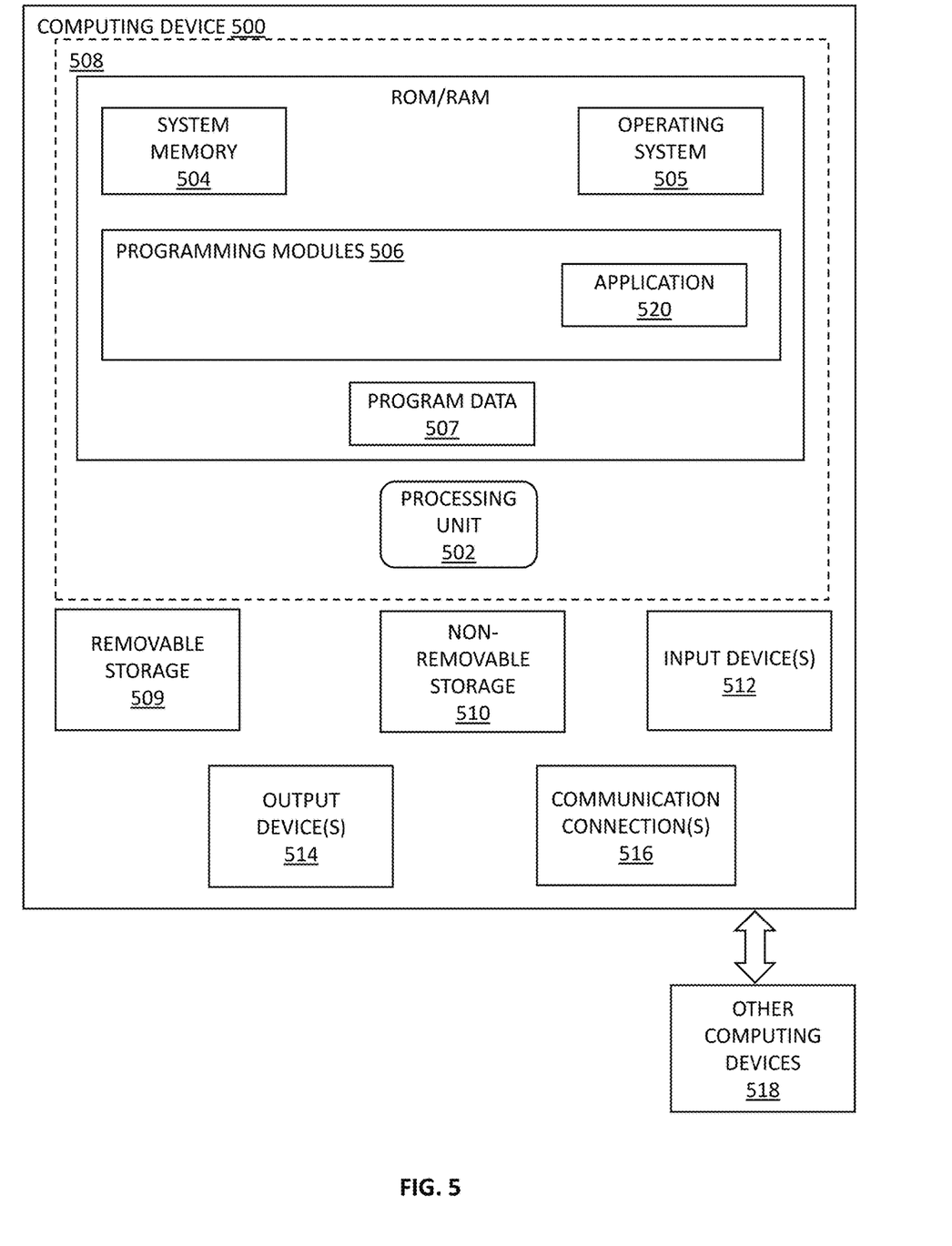
FIG. 5 depicts an exemplary system configuration according to certain embodiments.

With reference to FIG. 5, a system consistent with an embodiment of the disclosure may include a computing device or cloud service, such as computing device 500. For example, computing device 110, computing device 120, as well as computing devices containing digital content information stores 130 may be represented by computing device 500. In a basic configuration, computing device 500 may include at least one processing unit 502 (e.g., control circuit 112) and a system memory 504. Depending on the configuration and type of computing device, system memory 504 may comprise, but is not limited to, volatile (e.g. random-access memory (RAM)), nonvolatile (e.g. read-only memory (ROM)), flash memory, or any combination.

System memory 504 may include operating system 505, one or more programming modules 506, and may include a program data 507. In some aspects, program data 507 can include program files 116, digital content items 136, metadata 134, API files 132, digital content user interface 124, or a combination of two or more thereof. Operating system 505, for example, may be suitable for controlling computing device 500's operation. In one embodiment, programming modules 506 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, a location sensor, a camera, a biometric sensor, etc. Output device(s) 514 such as a display (e.g., display 122), speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet (e.g., network 140). Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., application 520 such as a media player) may perform processes including, for example, one or more stages of methods, algorithms, systems, applications, servers, databases as described above. The aforementioned process is an example, and processing unit 502 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments conveyed herein seek to disclose systems and methods to enable digital content aggregation. In certain embodiments, the system can comprise at least one user computing device(s) 120 comprising at least one display 122 configured to render a digital content user interface(s) 124. Digital content user interfaces 124 can be configured to convey digital content items 136 from unique digital content platforms. The system can further comprise a plurality of digital content information stores 130, each associated with one of the unique content platforms and comprising a plurality of unique digital content items 136. Control circuit(s) 112 may be communicatively coupled to the user computing device 120 and the plurality of digital content information stores 130.

Control circuit(s) 112 may be configured to, amongst other things, receive, via the user computing device 120, authentication data. A query for at least one digital content item 136 of interest can be received via the user computing device 120. Using the authentication data, the plurality of digital content information stores 130 can be accessed. The presence of the digital content item 136 of interest(s) in at least one of the plurality of unique digital content information stores 130 can be determined. The digital content item(s) 136 of interest can be transmitted to the digital content user interface 124 for rendering via the display 122 when the digital content item 136 of interest is determined to be present in at least one of the plurality of unique digital content information stores 130. The step of rendering may utilize at least one predetermined visualization scheme.

To transmit the digital content item(s) 136 of interest to the digital content user interface 124 the control circuit 112 may be configured to format the digital content item(s) 136 of interest to enable the digital content user interface 124 to convey the query results using the predetermined visualization scheme(s). To format the digital content item(s) 136 of interest the control circuit 112 can be configured to utilize one or more of pixel interpolation, image sharpening, warp stabilization, exposure adjustment, frame averaging, speed reduction, and demonstrative highlighting. The plurality of digital content items 136 may each comprise one or more of streaming audio content and streaming video content.

The plurality of digital content items 136 may each comprise one or more electronic books, audio files, and digital images, or a combination of two or more thereof. Authentication data can comprise one username and one password. To access the plurality of digital content information stores 130, the control circuit(s) 112 can be configured to access, using the authentication data, a plurality of API files 132 each associated with one of the plurality of digital content information stores 130. An IP address associated with the user computing device 112 can be determined. The IP address can be associated with one or more of a country, a region, and a city. One or more language protocols and GUI items can be associated with one or more of the country, the region, and the city can be determined. Predetermined visualization schemes can comprise the language protocol, the GUI item, or a combination of the two.

Queries can each comprise a plurality of query items. In determining the presence of the digital content item(s) 136 of interest, (i) a plurality of metadata APIs (e.g., of API files 132) each configured to access descriptive metadata (e.g., of metadata 134) for a digital content item 136 included in one of the plurality of digital content information stores 130 can be accessed; and (ii) whether the descriptive metadata comprises a threshold quantity of the plurality of query items can be determined. A plurality of metadata APIs each associated with one of the plurality of digital content information stores 130 and configured to access descriptive metadata for a digital content item 136 included in one of the plurality of digital content information stores 130 can be accessed. The descriptive metadata associated with the query item can be determined. A listing of digital content items 136 can be transmitted to the digital content user interface 124 for rendering via the display 122, the listing of digital content items 136 associated with the determined descriptive metadata.

The method can comprise receiving, via computing device 110, authentication data from at least one user computing device 120 comprising at least one display 122 that may be configured to render a digital content user interface 124, the digital content user interface 124 may be configured to convey digital content items 136 from unique digital content platforms; accessing, via computing device 110, a plurality of digital content information stores 130 using the authentication data, each digital content information store 130 may be associated with a unique digital content platform and comprising a plurality of unique digital content items 136; determining, via computing device 110, the presence of the digital content item 136 of interest in at least one of the plurality of unique digital content information stores 130; and transmitting, via computing device 110, the digital content item(s) 136 of interest to the digital content user interface 124 for rendering via the display 122 when the digital content item 136 of interest is determined to be present in at least one of the plurality of unique digital content information stores 130, the rendering can utilize at least one predetermined visualization schemes.

The step of transmitting the digital content item of interest to the digital content user interface can include formatting, via computing device 110, each digital content item 136 of interest to enable the digital content user interface 124 to convey the query results using the predetermined visualization scheme(s). Formatting the digital content item of interest can include formatting, via computing device 110, digital content items 136 of interest utilizing pixel interpolation, image sharpening, warp stabilization, exposure adjustment, frame averaging, speed reduction, demonstrative highlighting, or a combination of two or more thereof. The plurality of digital content items 136 can each comprise streaming audio content, streaming video content, or a combination of two or more thereof.

The plurality of digital content items 136 can each include one or more electronic books, audio files, digital images, or combination of two or more thereof. Authentication data can include one username and one password. Accessing the plurality of digital content information stores can include accessing, via computing device 110, a plurality of API files 132 using the authentication data. Each API files 132 can be associated with one of the plurality of digital content information stores 130. The method may also include determining, via computing device 110, an IP address associated with the user computing device 120, where the IP address can be associated with a country, a region, a city, or two or more thereof; determining, via computing device 110, a language protocol(s) and GUI items associated with the country, the region, the city, or two or more thereof. Here, the predetermined visualization scheme(s) can include the language protocol(s), the GUI item(s), or two or more thereof.

Queries can include a plurality of query items. Determining, via computing device 110, the presence of the digital content item 136 of interest can include: accessing, via computing device 110, a plurality of metadata APIs (e.g., API files 132) each configured to access descriptive metadata (e.g., of metadata 134) for a digital content item 136 included in one of the plurality of digital content information stores 130; and determining, via computing device 110, whether the descriptive metadata includes a threshold quantity of the plurality of query items.

The method can include: accessing, via computing device 110, a plurality of metadata APIs (e.g., of API files 132) each associated with one of the plurality of digital content information stores 130 and configured to access descriptive metadata (e.g., of metadata 134) for a digital content item 136 included in one of the plurality of digital content information stores 130; and determining the descriptive metadata associated with a query item of the query; and transmitting, via computing device 110, a listing of digital content items to the digital content user interface(s) 124 for rendering via the display(s), the listing of digital content items 136 associated with the descriptive metadata.

Figure 6:
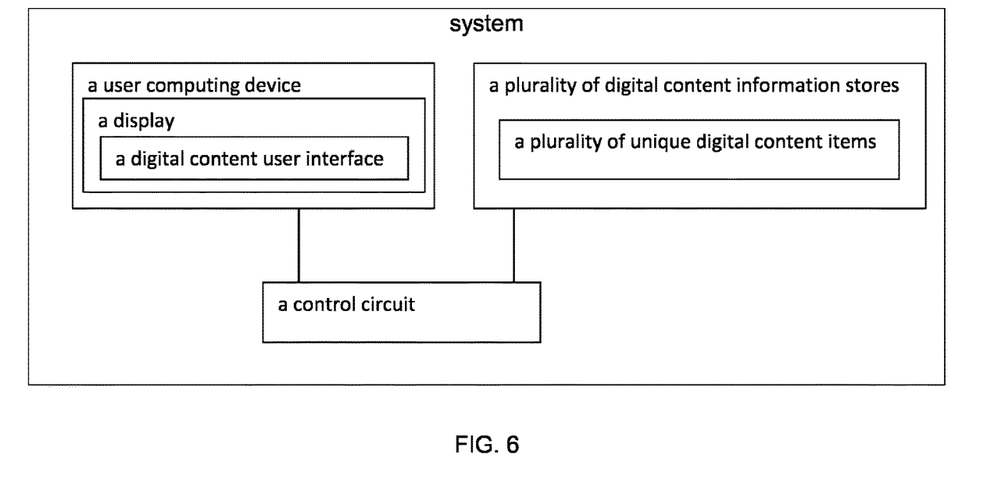
FIG. 6 is a block diagram illustrating a system for enabling digital content aggregation and distribution.
Figure 7:
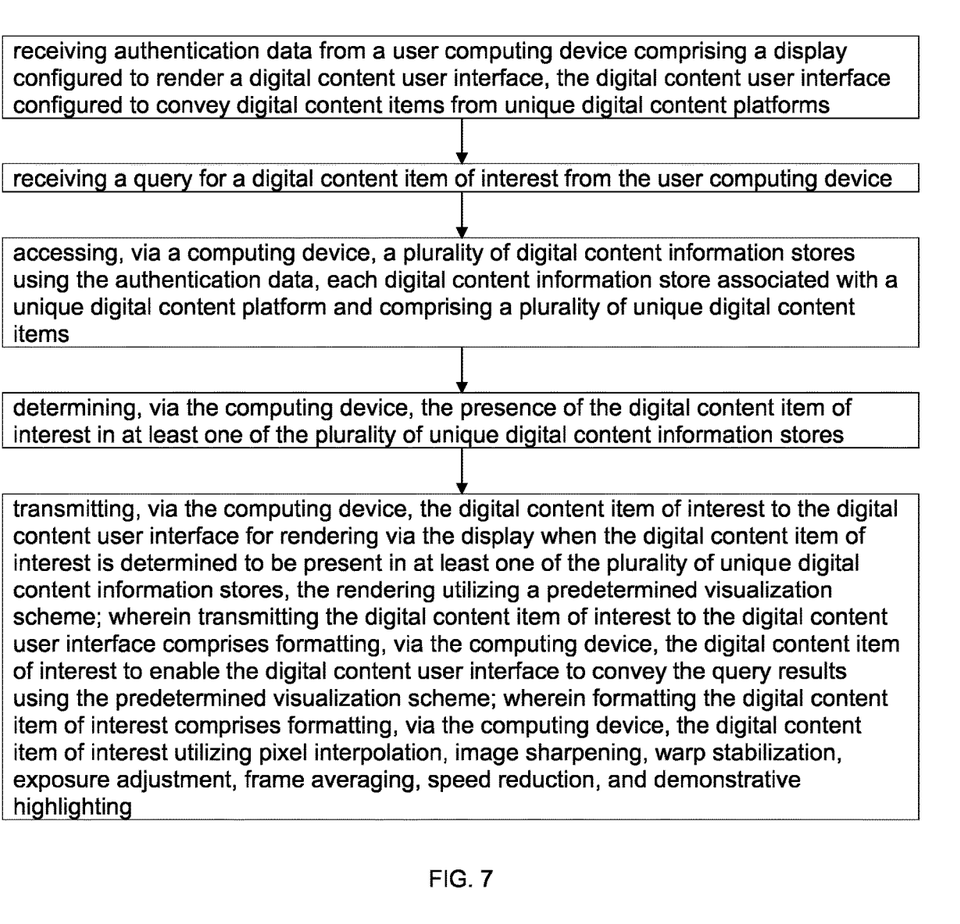
FIG. 7 is a flow chart illustrating a method for enabling digital content aggregation and distribution.

In summary, FIG. 6 is a block diagram illustrating a system for enabling digital content aggregation and distribution, and FIG. 7 is a flow chart illustrating a method for enabling digital content aggregation and distribution.

Although the invention has been explained in relation to its preferred embodiment, it is to be understood that many other possible modifications and variations can be made without departing from the spirit and scope of the invention. In other words, various embodiments may include some, none, or all of the enumerated advantages. Other technical advantages may become readily apparent to one of ordinary skill in the art after review of the following figures and description.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A system for enabling digital content aggregation and distribution, the system comprising:
 a user computing device comprising a display configured to render a digital content user interface, the digital content user interface configured to convey digital content items from unique digital content platforms;
 a plurality of digital content information stores, each digital content information store associated with one of the unique digital content platforms and comprising a plurality of unique digital content items;
 a control circuit communicatively coupled to the user computing device and the plurality of digital content information stores, the control circuit configured to:
  receive, via the user computing device, authentication data;
  receive, via the user computing device, a query for a digital content item of interest;
  access, using the authentication data, the plurality of digital content information stores;
  determine the presence of the digital content item of interest in at least one of the plurality of unique digital content information stores; and
  transmit the digital content item of interest to the digital content user interface for rendering via the display when the digital content item of interest is determined to be present in at least one of the plurality of unique digital content information stores, the rendering utilizing a predetermined visualization scheme;
wherein in transmitting the digital content item of interest to the digital content user interface the control circuit is configured to format the digital content item of interest to enable the digital content user interface to convey the query results using the predetermined visualization scheme;
wherein in formatting the digital content item of interest the control circuit is configured to utilize pixel interpolation, image sharpening, warp stabilization, exposure adjustment, frame averaging, speed reduction, and demonstrative highlighting.

2. The system of claim 1, wherein
the authentication data comprises one username and one password; and
in accessing the plurality of digital content information stores, the control circuit is configured to access, using the authentication data, a plurality of application programming interfaces ("API") each associated with one of the plurality of digital content information stores.

3. The system of claim 1, wherein
the control circuit is configured to:
 determine an Internet Protocol ("IP") address associated with the user computing device, the IP address associated with one or more of a country, a region, and a city;
 determine one or more of a language protocol and a graphical user interface ("GUI") item associated with one or more of the country, the region, and the city; and
the predetermined visualization scheme comprises one or more of the language protocol and the GUI item.

4. The system of claim 1, wherein
the query comprises a plurality of query items;
in determining the presence of the digital content item of interest the control circuit is configured to:
 access a plurality of metadata APIs each configured to access descriptive metadata for a digital content item included in one of the plurality of digital content information stores; and
 determine whether the descriptive metadata comprises a threshold quantity of the plurality of query items.

5. The system of claim 1, wherein
the query comprises a query item; and
the control circuit is configured to:
 access a plurality of metadata APIs each associated with one of the plurality of content information stores and configured to access descriptive metadata for a digital content item included in one of the plurality of digital content information stores;
 determine the descriptive metadata associated with the query item; and
 transmit a listing of digital content items to the digital content user interface for rendering via the display, the listing of digital content items associated with the determined descriptive metadata.

6. A method for enabling digital content aggregation and distribution, the method comprising:
 receiving authentication data from a user computing device comprising a display configured to render a digital content user interface, the digital content user interface configured to convey digital content items from unique digital content platforms;
 receiving a query for a digital content item of interest from the user computing device;
 accessing, via a computing device, a plurality of digital content information stores using the authentication data, each digital content information store associated with a unique digital content platform and comprising a plurality of unique digital content items;
 determining, via the computing device, the presence of the digital content item of interest in at least one of the plurality of unique digital content information stores; and
 transmitting, via the computing device, the digital content item of interest to the digital content user interface for rendering via the display when the digital content item of interest is determined to be present in at least one of the plurality of unique digital content information stores, the rendering utilizing a predetermined visualization scheme;
 wherein transmitting the digital content item of interest to the digital content user interface comprises formatting, via the computing device, the digital content item of interest to enable the digital content user interface to convey the query results using the predetermined visualization scheme;
 wherein formatting the digital content item of interest comprises formatting, via the computing device, the digital content item of interest utilizing one or more of pixel interpolation, image sharpening, warp stabilization, exposure adjustment, frame averaging, speed reduction, and demonstrative highlighting.

7. The method of claim 6, wherein the plurality of digital content items each comprise one or more of a streaming audio content and a streaming video content.

8. The method of claim 6, wherein the plurality of digital content items each comprise one or more of an electronic book, an audio file, and a digital image.

9. The method of claim 6, wherein
the authentication data comprises one username and one password; and
accessing the plurality of digital content information stores comprises accessing a plurality of application programming interfaces ("API") using the authentication data, each API associated with one of the plurality of digital content information stores.

10. The method of claim 6, further comprising:
 determining, via the computing device, an Internet Protocol ("IP") address associated with the user computing device, the IP address associated with one or more of a country, a region, and a city;
 determining, via the computing device, one or more of a language protocol and a graphical user interface ("GUI") item associated with one or more of the country, the region, and the city; and
 wherein the predetermined visualization scheme comprises one or more of the language protocol and the GUI item.

11. The method of claim 6, wherein
the query comprises a plurality of query items;
determining the presence of the digital content item of interest comprises:
 accessing, via the computing device, a plurality of metadata APIs each configured to access descriptive metadata for a digital content item included in one of the plurality of digital content information stores; and
 determining, via the computing device, whether the descriptive metadata comprises a threshold quantity of the plurality of query items.

12. The method of claim 6, further comprising:
- accessing, via the computing device, a plurality of metadata APIs each associated with one of the plurality of content information stores and configured to access descriptive metadata for a digital content item included in one of the plurality of digital content information stores;
- determining, via the computing device, the descriptive metadata associated with a query item of the query; and
- transmitting, via the computing device, a listing of digital content objects to the digital content user interface for rendering via the display, the listing of digital content items associated with the descriptive metadata.

* * * * *